United States Patent
Park et al.

(10) Patent No.: US 8,152,423 B2
(45) Date of Patent: Apr. 10, 2012

(54) 3-DIMENSIONAL VARIABLE-AXIS MACHINE

(75) Inventors: Jong Kweon Park, Daejeon (KR);
Hyung Wook Park, Gwangju (KR);
Hung Sun Son, Gyeonggi-Do (KR);
Yeong Sang Jeong, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 699 days.

(21) Appl. No.: 12/392,810

(22) Filed: Feb. 25, 2009

(65) Prior Publication Data

US 2010/0107787 A1    May 6, 2010

(30) Foreign Application Priority Data

Nov. 3, 2008 (KR) .................. 10-2008-0108376

(51) Int. Cl.
*B23C 1/12* (2006.01)
(52) U.S. Cl. ........ 409/216; 408/236; 409/199; 409/201; 409/202; 409/211
(58) Field of Classification Search .................. 409/175, 409/178, 179, 199, 201, 202, 211, 212, 216, 409/235; 408/88, 234, 236–237; *B23C 1/12*
See application file for complete search history.

(56) References Cited

U.S. PATENT DOCUMENTS

| | | | | |
|---|---|---|---|---|
| 2,948,168 A | * | 8/1960 | McCormick | 408/69 |
| 3,413,893 A | * | 12/1968 | Wilson | 409/217 |
| 3,835,527 A | * | 9/1974 | Cornair | 29/560 |
| 4,108,566 A | * | 8/1978 | Jones | 408/115 R |
| 4,589,174 A | * | 5/1986 | Allen | 29/33 R |
| 4,752,160 A | * | 6/1988 | Murray et al. | 408/16 |
| 4,830,555 A | * | 5/1989 | Conachen | 409/178 |
| 4,850,763 A | * | 7/1989 | Jack et al. | 409/178 |
| 4,858,301 A | * | 8/1989 | Galarowic | 29/563 |
| 5,238,340 A | * | 8/1993 | Ochiai et al. | 409/201 |
| 5,943,750 A | | 8/1999 | Koren et al. | |

(Continued)

FOREIGN PATENT DOCUMENTS

DE        10027509 A1  *  12/2001
(Continued)

OTHER PUBLICATIONS

European Search Report issued on Mar. 12, 2010 in Application No. 09153798.5-2302.

*Primary Examiner* — Daniel Howell
(74) *Attorney, Agent, or Firm* — Kile Park Goekjian Reed & McManus PLLC (57) ABSTRACT

A 3-dimensional (3D) variable-axis machine is disclosed, which includes a frame spaced from a base to be disposed at an upper surface of a workpiece, a pair of forward and backward pivoting frames having an arch shape connected to the frame, a pair of leftward and rightward pivoting frames having an arch shape and a relatively less height than the forward and backward pivoting frames to be connected across the forward and backward pivoting frames, and a spindle vertically inserted in an intersectional portion between the forward and backward and the leftward and rightward pivoting frames to be pivoted corresponding to movements of the both pivoting frames. The spindle is connected to a sliding member, and the sliding member is connected to a lower surface of the forward and backward pivoting frames and an upper surface of the leftward and rightward pivoting frames in a sliding manner.

8 Claims, 6 Drawing Sheets

U.S. PATENT DOCUMENTS

| | | |
|---|---|---|
| 6,798,088 B2 * | 9/2004 | Hsu et al. .................. 310/12.13 |
| 2006/0008335 A1 * | 1/2006 | Furuhashi et al. ............ 409/202 |
| 2007/0048098 A1 | 3/2007 | Bone et al. |
| 2011/0280680 A1 * | 11/2011 | Park et al. .................... 409/211 |

FOREIGN PATENT DOCUMENTS

| | | | |
|---|---|---|---|
| DE | 10124935 C1 | * | 9/2002 |
| DE | 10348442 A1 | * | 6/2005 |
| JP | 03-272462 A | | 12/1991 |
| JP | 06-039663 A | | 2/1994 |
| JP | 2000-230548 A | | 8/2000 |
| JP | 2006239813 A | * | 9/2006 |
| SU | 1016089 A | * | 5/1983 |

\* cited by examiner

3-DIMENSIONAL VARIABLE-AXIS MACHINE

BACKGROUND OF THE INVENTION

1. Field of the Invention

The present invention relates to a 3-dimensional (3D) variable-axis machine capable of 3D processing a workpiece with a very simple structure by comprising one spindle for processing the workpiece, which is variably moved in upward, downward, leftward and rightward directions, and more particularly to a 3D variable-axis machine including a frame spaced apart from a base to be disposed at an upper part of a workpiece being processed, a pair of forward and backward pivoting frames each having an arch shape connected to the frame, a pair of leftward and rightward pivoting frames each having an arch shape and a relatively less height than the forward and backward pivoting frames to be connected across the forward and backward pivoting frames, and the spindle vertically inserted in an intersectional portion between the forward and backward pivoting frames and the leftward and rightward pivoting frames to be pivoted corresponding to movements of the forward and backward pivoting frames and the leftward and rightward pivoting frames, wherein the spindle is connected to a sliding member, and the sliding member is connected to a lower surface of the forward and backward pivoting frames and an upper surface of the leftward and rightward pivoting frames in a sliding manner.

2. Description of the Related Art

Generally, a laser processing machine has been developed and used to process a workpiece 3-dimensionally.

However, such a laser processing machine is applied mainly in processing a small-size workpiece rather than a large-size one.

Accordingly, 3-axis, 4-axis, and 5-axis machining machines have been developed in order for processing of the large-size workpiece.

Those multi-axis machining machines are, however, usually huge and very complicated in structure since having multiple main axes. Consequently, in addition, the price of the machines is very high.

SUMMARY OF THE INVENTION

Therefore, the present invention has been made in view of the above problems, and it is an object of the present invention to provide a 3D variable-axis machine capable of processing a workpiece simply and conveniently by being constituted by one spindle for processing the workpiece, the spindle which is variably moved in upward, downward, leftward and rightward directions.

In accordance with the present invention, the above and other objects can be accomplished by the provision of a 3D variable-axis machine including a frame spaced apart from a base to be disposed at an upper part of a workpiece being processed, a pair of forward and backward pivoting frames each having an arch shape connected to the frame, a pair of leftward and rightward pivoting frames each having an arch shape and a relatively less height than the forward and backward pivoting frames to be connected across the forward and backward pivoting frames, and a spindle vertically inserted in an intersectional portion between the forward and backward pivoting frames and the leftward and rightward pivoting frames to be pivoted corresponding to movements of the forward and backward pivoting frames and the leftward and rightward pivoting frames, wherein the spindle is connected to a sliding member, and the sliding member is connected to a lower surface of the forward and backward pivoting frames and an upper surface of the leftward and rightward pivoting frames in a sliding manner.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

Figure 1:
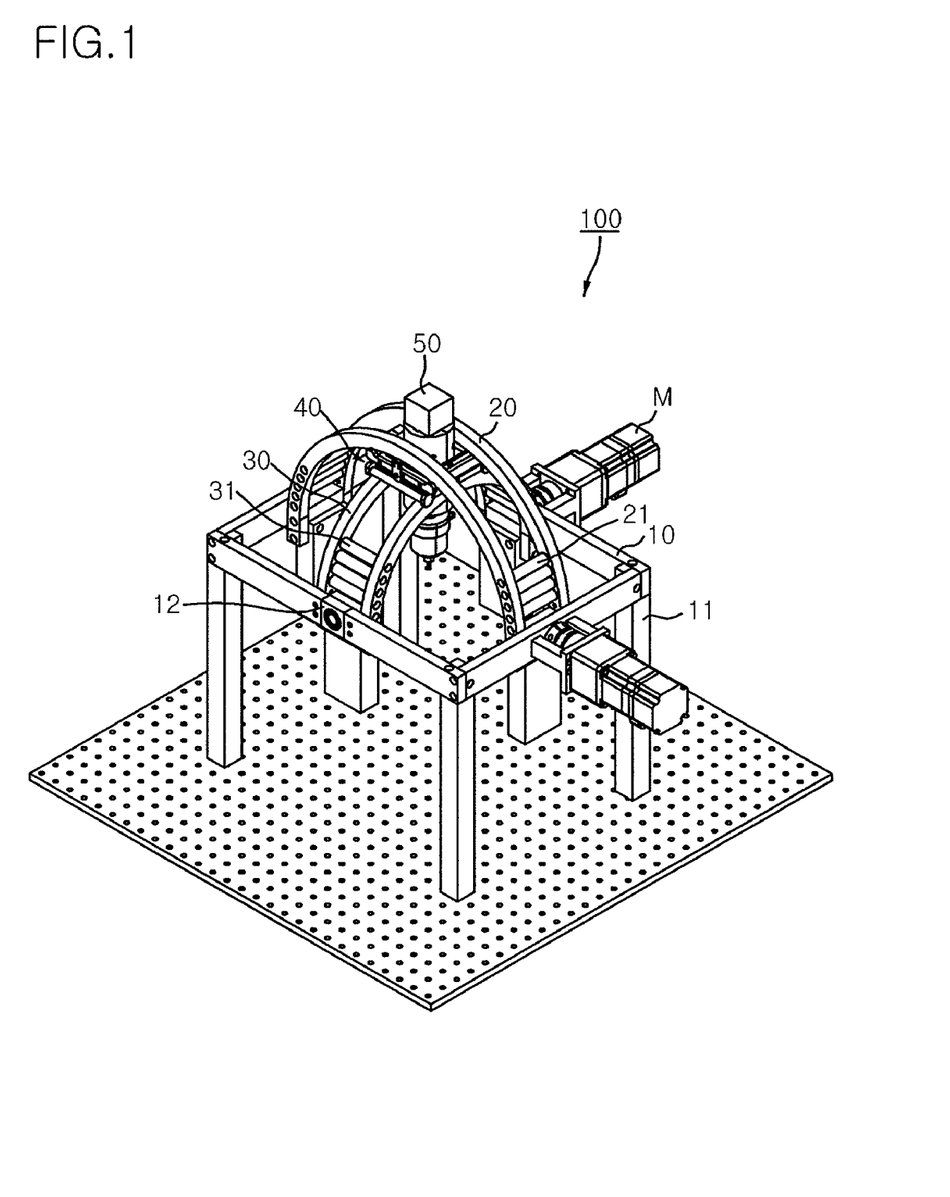
FIG. 1 is a perspective view of a 3-dimensional (3D) variable-axis machine according to an embodiment of the present invention.
Figure 2:
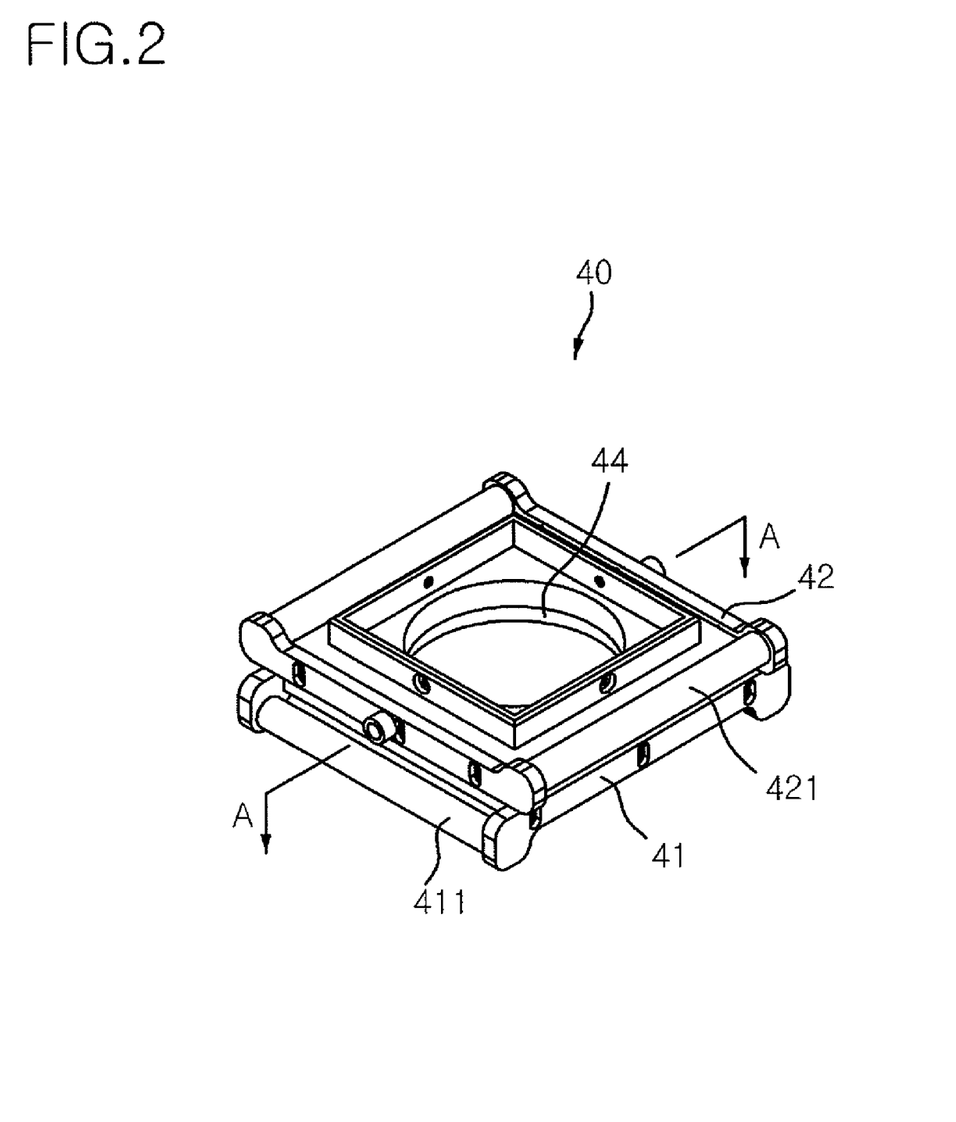
FIG. 2 is a perspective view of a sliding member as extracted from FIG. 1.
Figure 3:
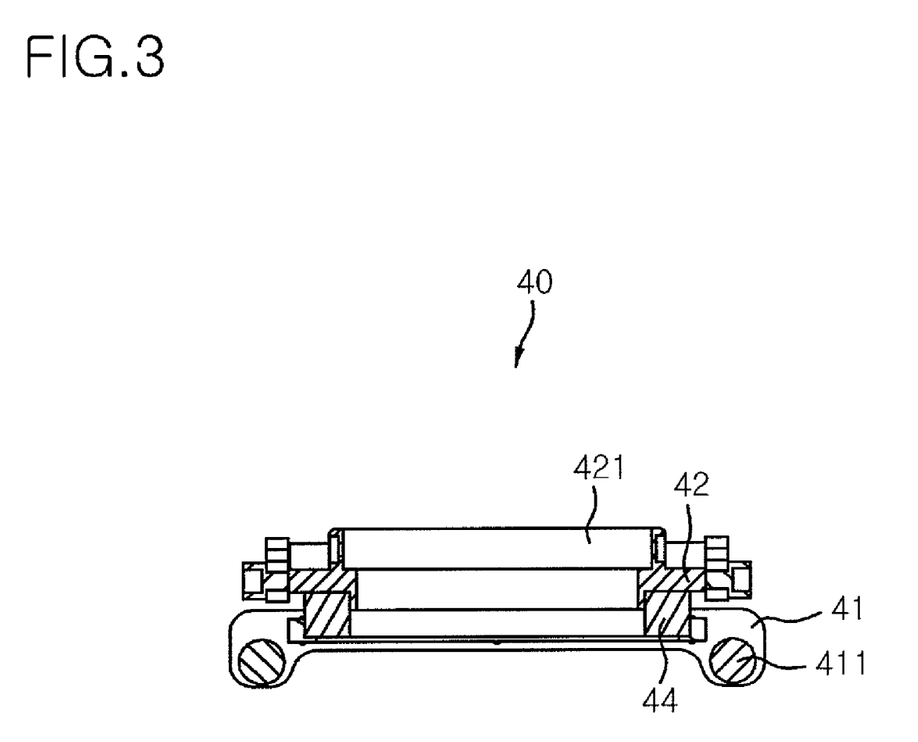
FIG. 3 is a sectional view of the sliding member, cut along a line A-A of FIG. 2.
Figure 4:
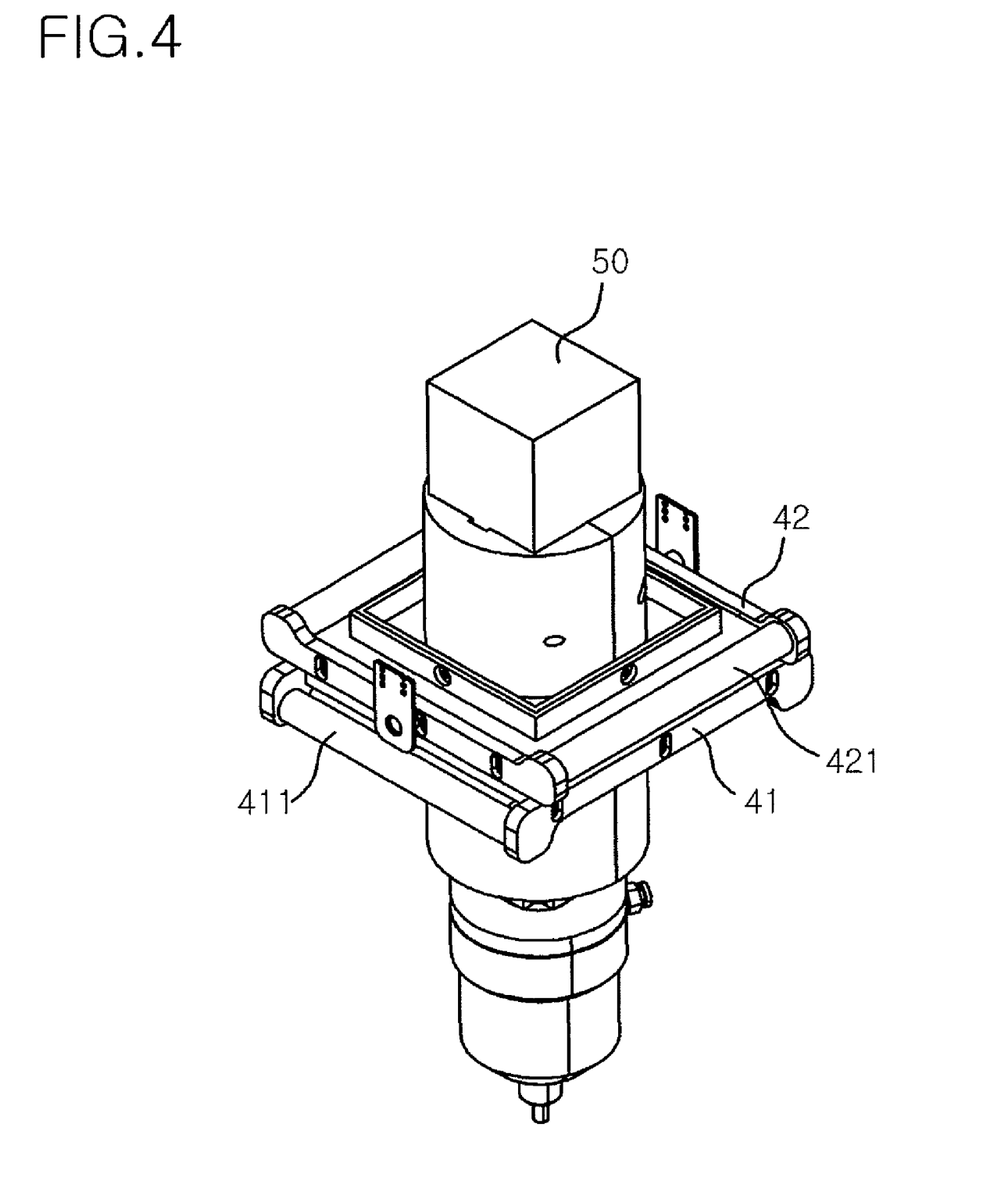
FIG. 4 is a view showing the sliding member and a spindle shown in FIG. 1 being assembled.

FIG. 1 is a perspective view of a 3-dimensional (3D) variable-axis machine according to an embodiment of the present invention. FIG. 2 is a perspective view of a sliding member as extracted from FIG. 1, FIG. 3 is a sectional view of the sliding member, cut along a line A-A of FIG. 2, and FIG. 4 is a view showing the sliding member and a spindle shown in FIG. 1 being assembled.

As shown in FIG. 1 through FIG. 4, the 3D variable-axis machine 100 according to an embodiment of the present invention comprises a single spindle 50 to process a workpiece. The spindle 50 is configured to be capable of processing a workpiece 3-dimensionally by variably moving in upward, downward, leftward and rightward directions using a forward and backward pivoting frame 20 and a leftward and rightward pivoting frame 30 both having an arch shape.

The 3D variable-axis machine is constituted mainly by 5 parts, that is, a frame 10, the forward and backward pivoting frame 20 and the leftward and rightward pivoting frame 30 which are connected to the frame 10, a sliding member 40, and the spindle 50 inserted in an intersectional portion between the forward and backward pivoting frame 20 and the leftward and rightward pivoting frame 30.

The frame 10 is spaced apart from a base by four supporting props 11, such that a workpiece (not shown) is disposed in the center thereof.

The frame 10 has a rectangular shape blocked at every side such that the forward and backward pivoting frame 20 and the leftward and rightward pivoting frame 30 can be connected to the frame 10.

A pair of the forward and backward pivoting frames 20 are provided, each having an arch shape connected to leftward and rightward sides of the frame 10 by both ends thereof.

The forward and backward pivoting frames 20 are forcibly pivoted by a motor M fixed to the frame 10.

A pair of the leftward and rightward pivoting frames 30 are provided, also having an arch shape connected to forward and backward sides of the frame 10 by both ends thereof.

Here, the leftward and rightward pivoting frame 30 has a relatively less height than the forward and backward pivoting frame 20 such that the both pivoting frames 20 and 30 can be simultaneously connected to the frame 10 across each other.

As described above, the forward and backward pivoting frame 20 and the leftward and rightward pivoting frame 30 are provided in pairs respectively and forcibly pivoted by the motors M.

Here, the frame 10 is equipped with two weight balances corresponding to total weight of the two motors M in order for favorable pivoting operations of the forward and backward pivoting frames 20 and the leftward and rightward pivoting frames 30 by the motors M.

In addition, the forward and backward pivoting frames 20 and the leftward and rightward pivoting frames 30 include a plurality of reinforcing rods 21 and 31, respectively, for maintaining an interval of each pair of the pivoting frames 20 and 30 and reinforcing the strength. More specifically, the intervals between the pair of forward and backward pivoting frames 20 and between the pair of leftward and rightward pivoting frames 30 need to be set to allow insertion of the spindle 50. For this, the reinforcing rods 21 and 31 have to be longer than a diameter of the spindle 50.

The spindle 50 is vertically inserted in an intersectional portion between the forward and backward pivoting frames 20 and the leftward and rightward pivoting frames 30, thereby being pivoted in upward, downward, leftward and rightward directions corresponding to movements of the forward and backward pivoting frames 20 and the leftward and rightward pivoting frames 30.

The spindle 50 is connected to the sliding member 40, and the sliding member 40 is connected to a lower surface of the forward and backward pivoting frames 20 and an upper surface of the leftward and rightward pivoting frames 30.

As shown in FIG. 2 and FIG. 3, the sliding member 40 comprises a first slide frame 41 and a second slide frame 42 rotatable with respect to each other, being mounted at different heights with a rotation bearing 44 disposed therebetween. The first slide frame 41 is connected to a lower outer side of the rotational bearing 44 whereas the second slide frame 42 is connected to an upper inner side of the rotation bearing 44.

The second slide frame 42 and the rotation bearing 44 are fixedly connected to the spindle 50. On the other hand, the first slide frame 41 is rotatably mounted to the outer side of the rotation bearing 44.

The second slide frame 42 is connected with a pair of first rollers 421 brought to close contact with a lower surface of the forward and backward pivoting frames 20. The first slide frame 41 is connected with a pair of second rollers 411 closely contacting an upper surface of the leftward and rightward pivoting frames 30.

According to the above structure of the sliding member 40, when the spindle 50 moves, the spindle 50 can be supported by the respective pivoting frames 20 and 30 without causing separation of the spindle 50. Furthermore, since the first slide frame 41 is rotated relative to the second slide frame 42, interference with the respective pivoting frames 20 and 30 can be prevented.

As a result, the above-structured 3D variable-axis machine is capable of processing the workpiece 3-dimensionally by variably moving the spindle 50 in upward, downward, leftward and rightward directions using the forward and backward pivoting frames 20 and the leftward and rightward pivoting frames 30 by the two motors M.

In addition, although not illustrated nor explained in the present invention, the spindle 50 can surely be moved in a vertical direction by connecting a linear motor to the spindle 50.

Figure 5:
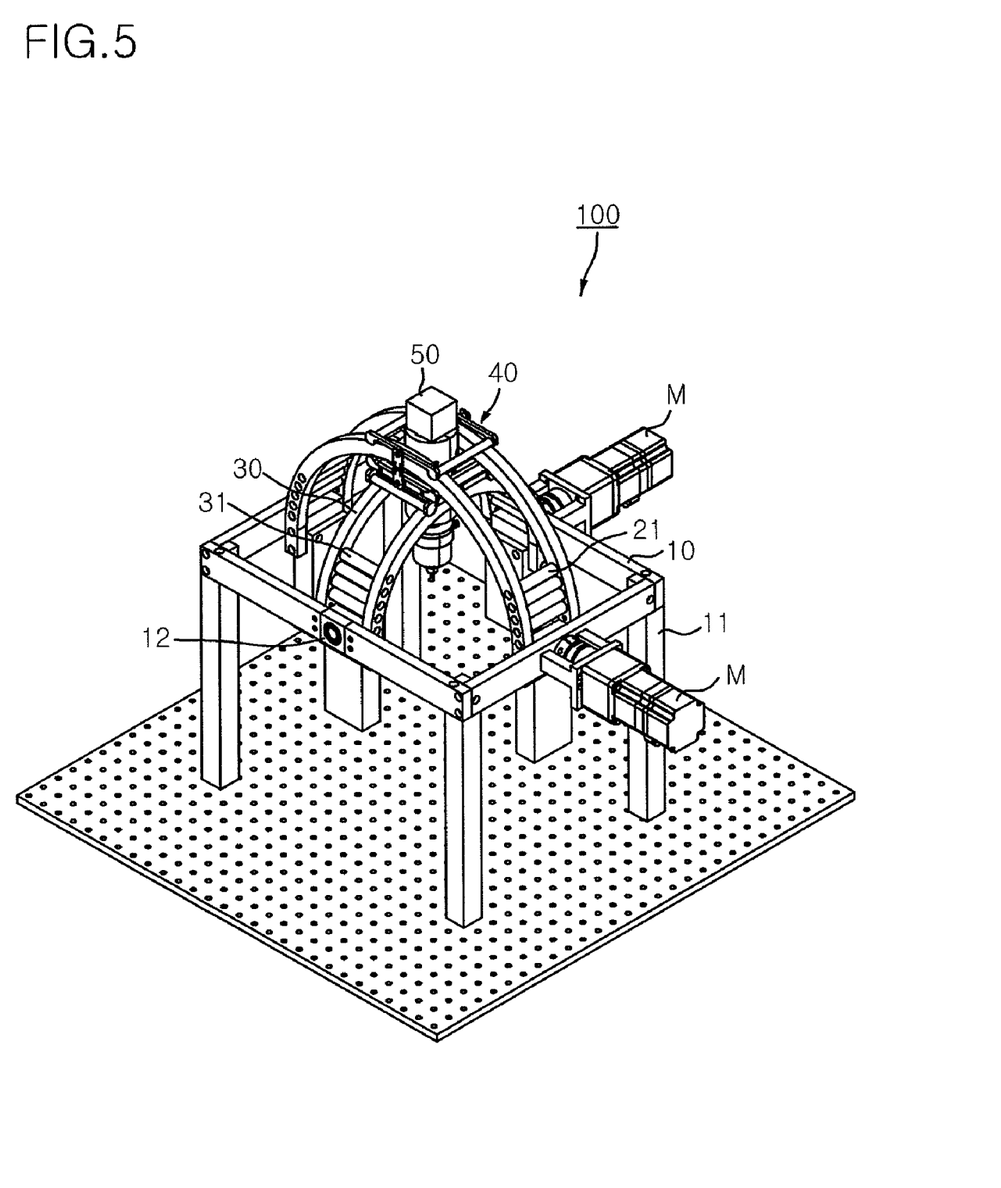
FIG. 5 is a perspective view of a 3D variable-axis machine applying a sliding member according to another embodiment of the present invention.
Figure 6:
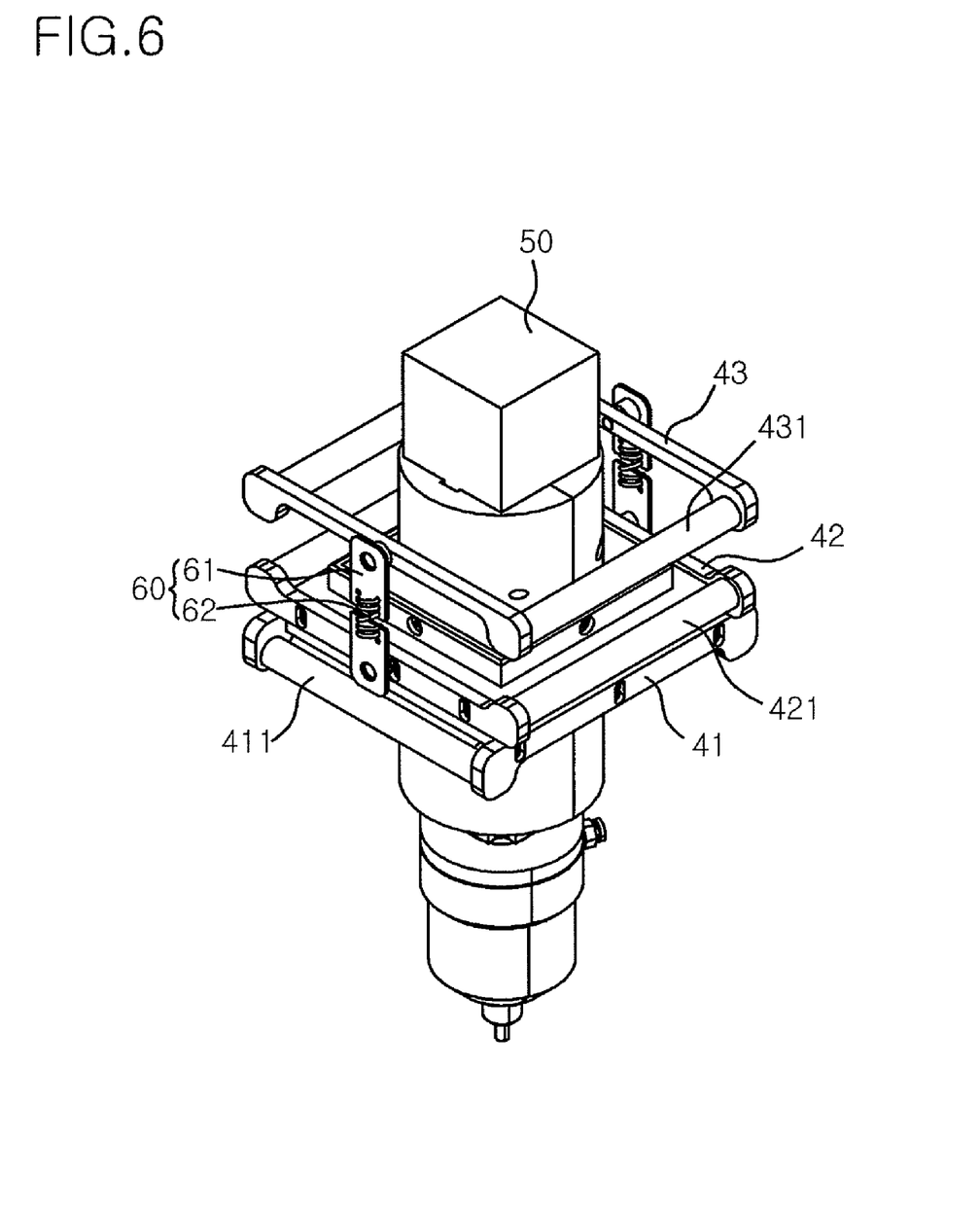
FIG. 6 is a view showing the sliding member and a spindle shown in FIG. 5 being assembled.

FIG. 5 is a perspective view of a 3D variable-axis machine applying a sliding member according to another embodiment of the present invention, and FIG. 6 is a view showing the sliding member and a spindle shown in FIG. 5 being assembled.

Referring to FIG. 5 and FIG. 6, the sliding member 40 according to another embodiment further comprises a third slide frame 43 elastically connected with the second slide frame 42 through an elastic member 60.

The third slide frame 43 is in close contact with the upper surface of the forward and backward pivoting frames 20 while being elastically connected with the second slide frame 42 through the elastic member 60.

Here, the elastic member 60 is constituted by connection bars 61 each connected to the second slide frame 42 and the third slide frame 43, and a spring 62 interconnecting the connection bar of the second slide frame 42 and the connection bar of the third slide frame 43.

In other words, the third slide frame 43 is connected to the upper surface of the forward and backward pivoting frames 20 preparing for a case that the first rollers 421 of the second slide frame 42 fail to closely contact the forward and backward pivoting frames 20.

That is, while the second rollers 411 can be easily maintained in close contact with the forward and backward pivoting frames 20 owing to weight of the slide member 40, the first rollers 421 may fail in the close contact. In this case, the problem can be overcome by connecting third rollers 431 connected to the third slide frame 43 to the upper surface of the forward and backward pivoting frames 20.

As apparent from the above description, the present invention provides a 3D variable-axis machine capable of 3D processing of a workpiece with a simple structure and at a low price.

Furthermore, the 3D variable-axis machine comprises a single spindle for processing the workpiece by variably moving in upward, downward, leftward and rightward directions using forward and backward pivoting frames and leftward and rightward pivoting frames both having an arch shape.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A 3-dimensional (3D) variable-axis machine comprising:
a frame spaced apart from a base to be disposed at an upper part of a workpiece being processed;
a pair of forward and backward pivoting frames each having an arch shape connected to the frame;
a pair of leftward and rightward pivoting frames each having an arch shape and a relatively less height than the forward and backward pivoting frames to be connected across the forward and backward pivoting frames; and
a spindle vertically inserted in an intersectional portion between the forward and backward pivoting frames and the leftward and rightward pivoting frames to be pivoted corresponding to movements of the forward and backward pivoting frames and the leftward and rightward pivoting frames, wherein the spindle is connected to a sliding member, and the sliding member is connected to a lower surface of the forward and backward pivoting frames and an upper surface of the leftward and rightward pivoting frames in a sliding manner.

2. The 3D variable-axis machine according to claim 1, wherein the forward and backward pivoting frames and the leftward and rightward pivoting frames are forcibly pivoted by motors connected to the respective pivoting frames.

3. The 3D variable-axis machine according to claim 1, wherein the forward and backward pivoting frames and the leftward and rightward pivoting frames are provided in pairs, each including a plurality of reinforcing rods for maintaining an interval between each pair and reinforcing the strength of the pivoting frames.

4. The 3D variable-axis machine according to claim 2, wherein the forward and backward pivoting frames and the leftward and rightward pivoting frames are provided in pairs, each including a plurality of reinforcing rods for maintaining an interval between each pair and reinforcing the strength of the pivoting frames.

5. The 3D variable-axis machine according to claim 1, wherein the sliding member comprises a first slide frame and a second slide frame which are rotatable with respect to each other, being mounted at different heights with a rotation bearing disposed therebetween in such a manner that the first slide frame is connected to a lower outer side of the rotational bearing whereas the second slide frame is connected to an upper inner side of the rotation bearing, the second slide frame is connected with a pair of first rollers brought into close contact with a lower surface of the forward and backward pivoting frames, and the first slide frame is connected with a pair of second rollers brought into close contact with an upper surface of the leftward and rightward pivoting frames.

6. The 3D variable-axis machine according to claim 5, wherein the sliding member further comprises a third slide frame elastically connected with the second slide frame through an elastic member and mounted with a third roller.

7. The 3D variable-axis machine according to claim 6, wherein the elastic member comprises connection bars each connected to the second slide frame and the third slide frame, and a spring interconnecting the connection bar of the second slide frame and the connection bar of the third slide frame.

8. The 3D variable-axis machine according to claim 6, wherein the third slide frame is in close contact with the upper surface of the leftward and rightward pivoting frames.

\* \* \* \* \*